United States Patent Office 3,552,767
Patented Jan. 5, 1971

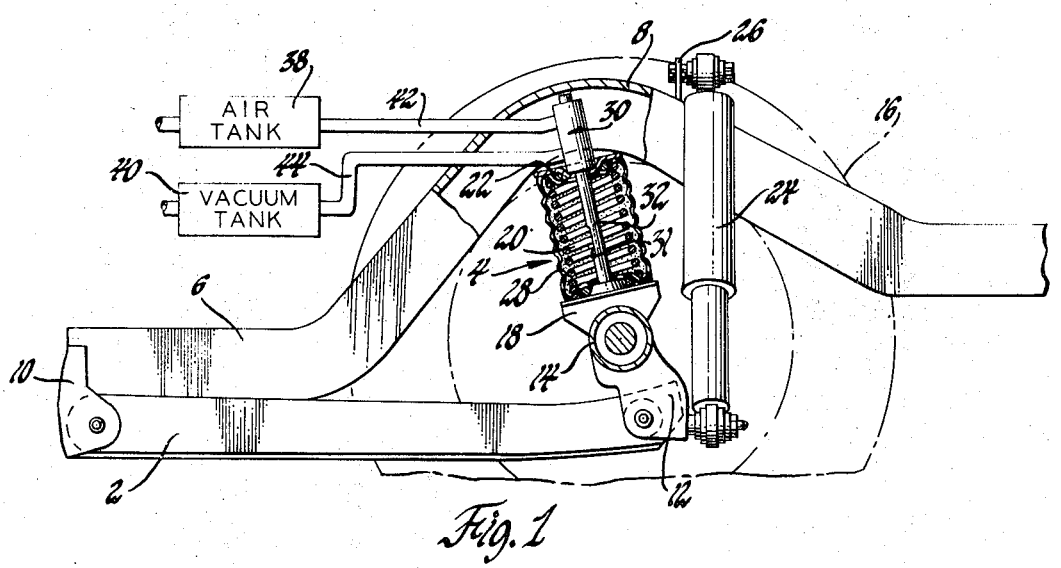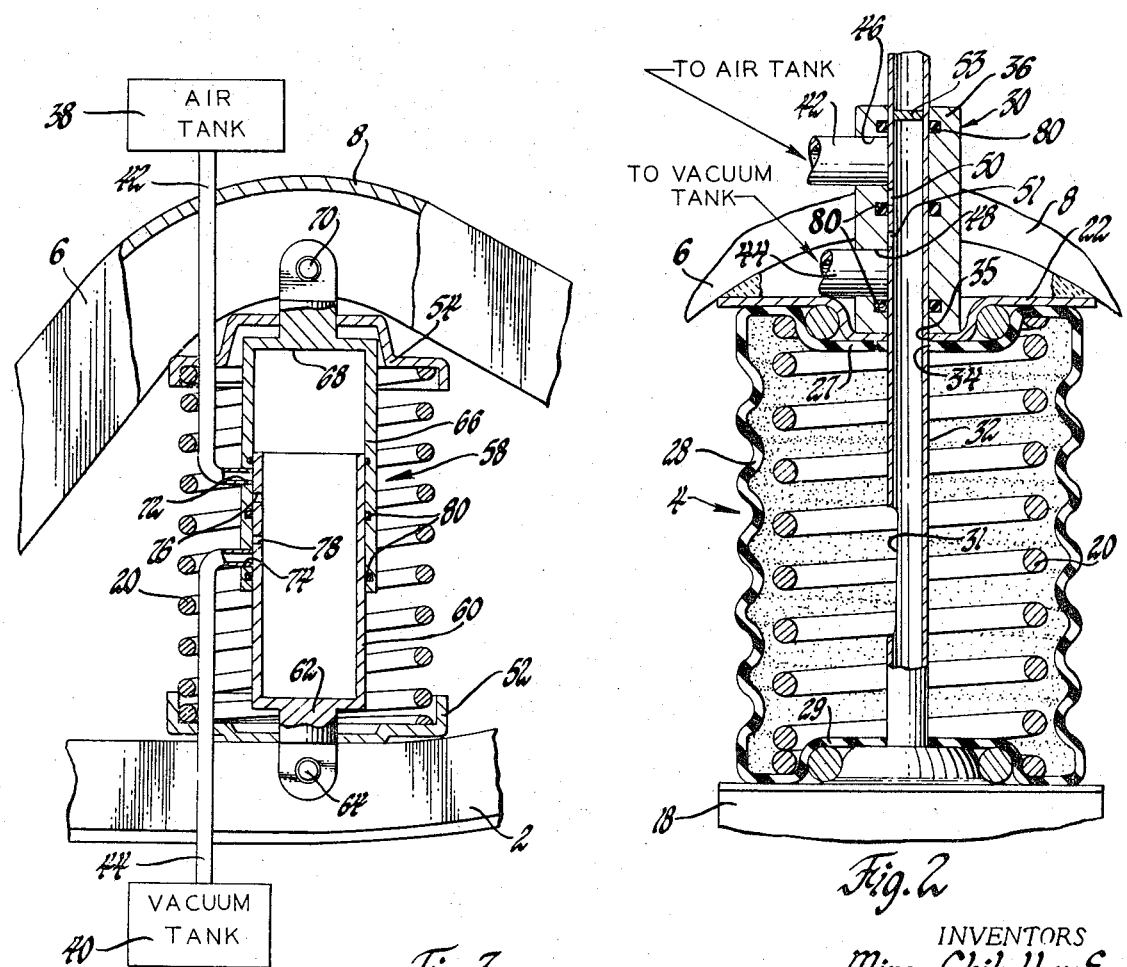

3,552,767
VEHICLE SUSPENSION HAVING A DUAL MODE COMPOSITE SPRING
Ming-Chih Yew, Sterling Heights, and Bernard J. Finn, Troy, Mich., assignors to General Motors Corporation, Detroit, Mich., a corporation of Delaware
Filed May 1, 1969, Ser. No. 820,732
Int. Cl. B60g 3/14
U.S. Cl. 280—124                                    5 Claims

ABSTRACT OF THE DISCLOSURE

A vehicle suspension having a dual mode composite spring which supports the sprung mass above the unsprung mass and includes a primary spring acting in parallel with a fluid spring which uses a vacuum to simulate a load on the primary spring when the vehicle is carrying less than the design load and adds to the lifting capacity of the primary spring by supplying positive pressure to the fluid spring when the vehicle is heavily loaded.

---

This invention concerns a vehicle suspension system and more specifically a composite spring assembly for a vehicle suspension system that uses a fluid spring acting in parallel with a primary spring to maintain the vehicle sprung mass at a predetermined trim under all loading conditions. It will be noted that whenever reference is made hereinafter to "unsprung mass" or "sprung mass," that the unsprung mass shall be considered as including that mass made up of the parts of the chassis which move with the wheels relative to the body as the vehicle is driven along the road while the sprung mass shall be that mass associated with the vehicle body and supported by the springs.

Throughout the history of the automobile industry, the standard suspensions in use have employed constant or fixed rate metal springs. Since nearly all modern vehicles are designed to carry a wide range of loads, the height at which these springs support the vehicle body and the pitch or the angle the longitudinal axis of the vehicle body makes with the ground will vary with the amount and placement of the loading. This variation in attitude of the vehicle body can at times detract greatly from the vehicle's appearance and, therefore, to minimize the problem, the vehicle's springs are designed to support the vehicle body at a "design height" which is the optimum operational height and pitch when the vehicle is carrying a "design load" which the maker feels will be the most common load for that car. The pitch variation problem, however, is greatly aggravated in the case of light compact cars because the variation in loading that the vehicle springs must be designed to carry is a relatively high percentage of the total vehicle weight. A further factor which complicates the selection of springs in light cars is that a relatively low spring rate should be used in order to achieve the comfortable low frequency ride which the public has become accustomed to. When the compact car is lightly loaded, however, the low rate springs tend to cause variations in ride height and pitch that are substantially greater than experienced in heavier vehicles.

As a consequence, many vehicle suspension systems have been proposed that incorporate leveling means for alleviating the above-mentioned problem. As one would expect, weight, cost, reliability and minimum interference with the normal operation of the vehicle suspension have been some of the carefully scrutinized considerations in formulating an acceptable design. Some of the proposed suspension systems have realized leveling through the use of fluid main springs, other have taken the approach of moving the seat of the main spring, while still other have accomplished leveling through the use of auxiliary springs. One drawback of leveling by using a fluid main spring is that the vehicle has no suspension at all when the vehicle spring loses its charge or fails for some reason. As to leveling by moving the seat of the main spring in a suspension arrangement, the primary disadvantages are that the spring rate is still a fixed rate and a relatively large number of parts are required to effect the change in the spring seat.

For low load operation, the suspension system should level the sprung mass without adding to the spring rate or interfering with the operation of the primary suspension spring so as not to make the vehicle ride seem harsh. However, for high load operation it is desirable not only to level the vehicle body by adding support for the sprung mass, but also to add to the spring rate so that the vehicle ride frequency remains approximately the same as during normal loading. The magnitude of the vehicle sprung mass oscillations is also an important consideration and should be maintained in a normal range to avoid bottoming of the sprung mass against the unsprung mass. Furthermore, leveling should occur under static loading conditions only so that the leveling effect does not adversely interfere with the dynamic operation of the suspension and produce erroneous pitch corrections. Providing the above-mentioned features in a suspension system that is as inexpensive compact, and as light as possible is possibly the most demanding and unyielding test of an acceptable leveling arrangement.

In the preferred form of this invention, the above requirements are fulfilled by a vehicle suspension having a dual mode fluid spring comprising a bellows which encloses and acts in parallel with a primary suspension spring. A source of subatmospheric pressure is connected to the fluid spring for lowering the vehicle when the latter is lightly loaded and riding high and conversely, a source of superatmospheric pressure is connected to the fluid spring to raise the vehicle and add to the spring rate when the vehicle is heavily loaded and riding low. Both the subatmospheric pressure and the superatmospheric pressure are alternatively and automatically supplied to the fluid spring by a valve arrangement which responds to static load conditions.

Accordingly, the objects of this invention are to provide a vehicle suspension having a leveling system which maintains the vehicle at a predetermined height irrespective of loading; to provide a vehicle suspension system utilizing a dual mode fluid spring acting in parallel with a primary spring and serving to both simulate a load by connecting to subatmospheric pressure when the vehicle is not occupied by a full complement of passengers and to add a lifting-force by connecting to superatmospheric pressure when the load on the vehicle exceeds the normal passenger complement; to provide a suspension system utilizing a fluid spring formed by a bellows which has sufficient radial rigidity to prevent collapsing thereof against a primary spring or ballooning into interference with other parts of the suspension while at the same time having sufficient axial flexibility so as not to add unnecessary rate to the primary spring; to provide a vehicle suspension having a dual mode fluid spring which is alternately connected to superatmospheric pressure and to subatmospheric pressure to respectively add carrying capacity in response to high load conditions and to simulate a load on the primary spring in response to low load conditions; to provide a dual mode fluid spring in a vehicle suspension that provides leveling and utilizes the freely available vacuum created by the operation of the vehicle's reciprocating engine; and to provide a vehicle suspension having a fluid spring which serves to level the vehicle and is combined with a metal support spring so if the fluid spring should fail or lose pressure for some reason, the vehicle body will return to a particular ride height for the given load rather than sag to an unacceptable level.

A more complete understanding of this invention can be obtained from the following detailed description when read in conjunction with the accompanying drawings in which:

FIG. 1 is an elevation view of a vehicle rear suspension showing a vehicle suspension made in accordance with the preferred form of the invention;

FIG. 2 is an enlarged fragmentary view showing in more detail the bellows and valve mechanism incorporated with the vehicle suspension of FIG. 1; and FIG. 3 is a detailed view showing a modified form of the invention.

Referring now to the drawings and specifically FIG. 1, a vehicle rear suspension is shown including a trailing arm 2 and a composite spring assembly 4. A side rail 6 of the motor vehicle frame is formed with the usual kickup or bowed portion 8 and rigidly supports a dependent bracket 10 which serves to pivotally secure the forward end of the trailing arm 2 to the frame. The rearward end of the trailing arm 2 pivotally supports a bracket 12 which carries the axle housing 14 supporting the wheel 16 (shown in phantom lines). A spring seat 18 is rigidly fixed to the axle housing 14 directly above bracket 12 and the composite spring assembly 4 is secured between spring seat 18 and a spring seat 22 rigidly carried by the kickup portion 8 of the frame side rail 6. A shock absorber 24 is pivotally fastened at its lower end to the rear end of the trailing arm 2 through bracket 12 and at its upper end to the kickup portion 8 of the frame side rail 6 by bracket 26.

The composite spring assembly 4 comprises a primary coil spring 20 for supporting the vehicle at the design height under design load combined with a concentrically located fluid spring 28 which acts in parallel with the primary coil spring 20 and provides a leveling effect to be described hereinafter. In accordance with the preferred form of the invention and as best shown in FIG. 2, the fluid spring is a radially rigid axially flexible bellows 28 shown enclosing the primary coil spring 20 and including upper and lower radially extending end walls 27 and 29, respectively, which are sealingly held against the spring seats 18 and 22 by the primary spring 20. The bellows 28 can be made of a flexible material such as urethane and is formed with accordian-like convolutions enabling axial extension with very little resistance while providing radial rigidly. In this regard it will be noted that the buckling load for a corrugated bellows is proportional to the bellows disc width or, in other words, the depth of the corrugations and the angle that these discs make with the horizontal while, on the other hand, the axial flexibility is inversely proportional to the cube of the disc width. Consequently, a bellows of the type used in the preferred form of the invention can easily be designed to provide adequate radial rigidity without adversely adding to the axial rate of deflection by increasing the disc width enough to raise the critical buckling load for the bellows beyond the loads to which the bellows will be subjected. This radial rigidity and the implied resistance to buckling is important for the proper operation of the composite spring assembly because it prevents the bellows 28 from collapsing against the coil spring 20 and thereby adversely affecting the spring rate and resultant ride characteristics. In addition, the rigid bellows 28 will not blow outward and interfere with other parts of the suspension. In the preferred form, the bellows 28 is located outside the coil spring 20 to maximize the effective operating area of the pressure or vacuum between the sprung and unsprung masses.

The bellows 28 is alternately connected with a source of subatmospheric pressure or superatmospheric pressure by a valve device shown generally by the number 30. The valve device 30 comprises a tubular element 32, the lower portion of which is located within the bellows 28 and is provided with at least one hole 31 that serves to fluidly connect the inside of the tubular element 32 with the interior of the bellows 28. It will be noted that the lower end of the tubular element 32 is securely fastened to the spring seat 18 while the upper end slidably extends through apertures 34 and 35, respectively, formed in the bellows end wall 27 and the spring seat 22. A valve sleeve 36 is fixedly connected with the spring seat 22 and serves to receive the ends of a pair of conduits 42 and 44. The conduits 42 and 44 are secured within ports 46 and 48 formed in the valve sleeve and respectively supply superatmospheric and subatmospheric pressure to the tubular element 32 from pressure storage tanks 38 and 40 which can be located anywhere on the vehicle that is convenient. The tubular element 32 slidably reciprocates within and relative to the valve sleeve 36 and has the upper portion thereof formed with two ports 50 and 51 and a plug 53 is provided for sealing the tubular element just above the uppermost port 50.

The ports 50 and 51 are vertically spaced and so located in the tubular element 32 that the uppermost port 50 will register with port 46 in the valve sleeve 36 and thereby supply superatmospheric pressure to the interior of tubular element 32 and accordingly the bellows 28 whenever the vehicle is excessively loaded. In other words, under conditions when the load on the vehicle is greater than the design load, the vehicle's weight will compress the primary spring 20 and bring the upper spring seat 22 closer to the lower spring seat 18 which causes the valve sleeve 36 to slide down over the tubular element 32 until the superatmospheric pressure port 46 in the valve sleeve 36 registers with the upper port 50 in the tubular element 32. Conversely, when the load on the vehicle is less than the design load, the primary spring 20 increases the displacement between the spring seats 18 and 22 and consequently slides the valve sleeve 36 up over the tubular element 32 until the subatmospheric pressure port 48 in the valve sleeve 36 registers with the lower port 51 in the tubular element 32.

While the composite spring assembly is in the subatmospheric mode, atmospheric pressure acting on the fluid spring causes the spring seats 22 and 18 to move toward one another, thereby simulating a load on the primary spring 20. On the other hand, while the composite spring assembly is in the superatmospheric mode, the superatmospheric pressure in the fluid spring causes the spring seats 22 and 18 to separate. As a result of the above-described dual mode operation of fluid spring, the total leveling capacity is greatly increased over a single mode spring without requiring large super or subatmospheric pressures because the range of leveling forces extends from negative to positive rather than from zero to the maximum possible with the available pressure. Other advantages are also realized by centering the range of the leveling forces about zero. For example, (1) the vehicle can be designed to ride at the desired height when no leveling force is being applied which minimizes the use of the system and provides the best possible suspension when the leveling system is inoperative; (2) an adequate leveling range is available utilizing only the engine vacuum as the subatmospheric pressure source; and (3) the strength requirements of the fluid spring components are lower because the system need be designed only for relative low gauge pressures.

One further advantage provided by the dual mode composite spring is that the composite spring rate effective for dynamic operation of the suspension increases as the static load on the vehicle increases but the increase is, as is desirable, low under low static loading conditions. This is because of the fact that the spring rate for the fluid spring is proportional to the absolute pressure in the spring.

In order to prevent the vehicle leveling system from adversely reacting to dynamic loads, the ports 50 and 51 in the tubular element 32 are sized so that significant changes in pressure within the bellows 28 will not occur as the tubular element 32 reciprocates up and down within valve sleeve 36 due to dynamic displacement of the sprung and unsprung masses caused by road conditions.

Furthermore, it should be noted that the number of ports and the size of the ports in a given form of the invention can be arranged in many ways to achieve the desired communication between the fluid spring and the pressure sources, and it should, therefore, be understood that this invention is not limited by the particular configurations shown in the presented forms of the invention.

In the alternate form of the invention shown in FIG. 3, the axially flexible plastic bellows of the preferred form of the invention shown in FIGS. 1 and 2 has been replaced by an extensible device, indicated generally by the numeral 58, which acts both as the fluid spring and the valve mechanism.

Other parts, however, which are identical to those incorporated with the embodiment of FIG. 1 are identified by corresponding numerals. Thus, the trailing arm 2 pivotally supports a lower cup-shaped spring seat 52 and the kickup portion 8 of the vehicle frame pivotally supports an upper cup-shaped spring seat 54. The primary coil spring 20 is held between the cup-shaped spring seats 52 and 54.

In this form of the invention, the extensible device or fluid spring 58 is comprised of a first open ended cylinder member 60 having its closed end 62 connected to the trailing arm 2 by a pivotal connection 64. A second open ended cylinder member 66 has its open end slidably disposed around the first mentioned cylindrical member 60 and has its closed end 68 connected to the kickup portion of the frame 8 by a pivotal connection 70. The cylinder members 60 and 66, which as aforementioned constitute the fluid spring 58 in this form of the invention, are merely an enlarged version of the tubular element 32 and valve sleeve 36 of the preferred form of the invention and, therefore, cooperate in a similar fashion for maintaining the vehicle at a predetermined design height. In this regard, it will be noted that cylinder member 66 corresponds to the valve sleeve 36 and has two vertically spaced ports 72 and 74 which are respectively connected by conduits 42 and 44 to the superatmospheric pressure source 38 and the subatmospheric pressure source 40. The cylinder member 60 also has two vertically spaced ports 76 and 78 corresponding to ports 50 and 51 in tubular element 32 which are located so that the uppermost port 76 will register with port 72 in the upper cylindrical member 66, and consequently with the superatmospheric pressure source 38, whenever the load on the vehicle is greater than the design load and thereby compresses the primary coil spring 20 sufficiently to slide cylinder member 66 down over cylinder member 60 to the extent necessary to register the above-mentioned ports. Conversely, when the vehicle is lightly loaded and the displacement between the spring seats 52 and 54 increases relative to the displacement at design load, the cylinder member 60 slides out of the cylinder member 66 so that at a predetermined load the lower port 78 registers with port 74 and is connected to the superatmospheric pressure source 40.

As should be apparent to those skilled in the art, ring seals 80 are placed in the outer sleeve 66 of the modified form of the invention and in the valve sleeve 36 and are located above and below the associated upper ports so as to prevent leakage of air between the two pressure sources and between the inner chamber of the fluid spring and the atmosphere. Moreover, the two described forms of the invention show the dual mode composite springs applied only with a rear suspension. It will be noted that the trim or the angle of the longitudinal axis of the vehicle body relative to the ground can be for the most part corrected by adjusting the height of one end of the vehicles only. This method requires only two bellows smaller pressure sources and provides the related advantages of lower weight and cost. Obviously, the composite spring assembly made according to this invention could be used at the front also also to gain the added advantages of a wider range of pitch and height control.

We claim:
1. In a vehicle having a sprung and unsprung mass:
 (a) spring means disposed between said sprung and unsprung mass supporting the former above the latter at a predetermined operational vertical spacing under design load;
 (b) a radially rigid axially extensible member disposed between said masses forming a closed chamber;
 (c) a source of subatmospheric pressure mounted on said vehicle;
 (d) a source of superatmospheric pressure mounted on said vehicle;
 (e) conduit means connecting said chamber with said sources;
 (f) and valve means associated with said conduits and automatically operable upon a decrease in loading and the consequent increase in displacement of said masses to effect communication between said chamber and said subatmospheric source so as to decrease said displacement between said masses, and upon an increase in loading and the consequent decrease in displacement from said spacing to effect communication between said chamber and said superatmospheric source so as to increase said displacement between said masses.

2. In a motor vehicle having a sprung and unsprung mass, a dual mode composite spring assembly at one end of the vehicle comprising:
 (a) a primary suspension spring disposed between said sprung and unsprung mass, said spring having a load sustaining capability sufficient to support the adjacent portion of the sprung mass above the unsprung mass at a level higher than the portions of the sprung mass at the opposite end of the vehicle;
 (b) a radially rigid expansible and contractible member connected between said sprung and unsprung mass in parallel relation with said primary suspension spring, said member defining a closed chamber;
 (c) a source of subatmospheric pressure;
 (d) a source of superatmospheric pressure;
 (e) fluid conduit means connecting said sources with said chamber;
 (f) valve means interposed between said fluid conduit means and said chamber providing communication with said sources;
 (g) said valve means arranged to respond to vertical displacement between said sprung and unsprung masses so that said chamber is alternately connected to said source of subatmospheric pressure when the load on the sprung mass is less than necessary to achieve a level vehicle attitude and said chamber is connected to said source of superatmospheric pressure when the load on the sprung mass is in excess of the amount necessary to achieve a level vehicle attitude.

3. In a vehicle having a sprung and unsprung mass:
 (a) spring means disposed between said sprung and unsprung mass supporting the former above the latter at a predetermined operational vertical spacing when the vehicle is normally loaded;
 (b) a radially rigid axially extensible member disposed between said masses forming a closed chamber;
 (c) a tubular element having a portion thereof located within said chamber, said tubular element having one end closed and attached to one of said masses, said tubular element having an aperture formed therein for fluidly connecting said chamber with the interior of said tubular element;
 (d) a valve sleeve rigidly carried by said other mass and located thereon so that the other end of said tubular element extends into and is slidably supported by said valve sleeve;

(e) a source of subatmospheric pressure;
(f) a source of superatmospheric pressure;
(g) conduit means connecting each of said pressure sources to said valve sleeve and providing a pair of axially spaced ports therein;
(h) the other end of said tubular element having at least one port formed therein and cooperating with said ports in said valve sleeve so that upon an increase in loading over the design load and the consequent decrease in displacement between said sprung and unsprung masses, one of said ports in said valve sleeve and the port in said tubular element will be aligned to provide communication between said chamber and said superatmospheric pressure source, and upon a decrease in loading over the design load and the consequent increase in displacement between said sprung and unsprung masses, the other of said ports in said valve sleeve and the port in said tubular element will be aligned to provide communication between said chamber and said subatmospheric pressure.

4. A vehicle suspension system for supporting the sprung mass on the unsprung mass,
(a) a primary spring element disposed between said sprung mass and said unsprung mass and adapted to support said sprung mass at a height greater than design height when said sprung mass is carrying less than design load;
(b) a source of subatmospheric pressure mounted on said sprung mass;
(c) a source of superatmospheric pressure mounted on said sprung mass;
(d) an extensible device located between said sprung and unsprung masses and comprising a first open ended cylinder member secured at its closed end to one of said masses and a second open ended cylinder member secured at its closed end to the other of said masses, said second cylinder member being slidably disposed within said first cylinder member and having at least one port formed therein, said first cylinder member having a pair of spaced ports formed therein;
(e) a pair of conduit means individually connecting each of said pressure sources with said pair of ports in said first cylinder member; said port in said second cylinder member being radially aligned so it alternately communicates with the ports in said first cylinder member when the latter reciprocates relative to said second cylinder member, said ports in said first cylinder member being vertically spaced a predetermined distance so that upon an increase in loading over the design load and the consequent decrease in displacement between said masses, said port in said second cylinder member and one of said ports in said first cylinder member connect said chamber with said source of superatmospheric pressure, and upon a decrease in loading over the design load and the consequent increase in displacement between said assemblies, the port in said second cylinder member and the other of said ports in said first cylinder member connect said chamber with said source of subatmospheric pressure.

5. In a motor vehicle having a sprung and unsprung mass, a dual mode composite spring assembly at the rear end of said vehicle comprising:
(a) a primary suspension spring disposed between said sprung and unsprung masses, said spring having a load sustaining capability sufficient to support the adjacent portion of the sprung mass above the unsprung mass at a level higher than the portion of the sprung mass at the opposite end of the vehicle when said vehicle is carrying its design load;
(b) a radially rigid axially flexible bellows disposed between said masses forming a closed chamber to be used as a fluid spring operating in parallel with said primary suspension spring, said bellows enclosing said primary suspension spring;
(c) a tubular closed element located within said bellows, one end of said tubular element attached to said unsprung mass and having at least one opening connecting the inside of said bellows to the inside of said tubular element;
(d) a valve sleeve mounted on said sprung mass where the upper end of said bellows is attached, said valve sleeve slidably receiving the free end of said tubular element and having two vertically spaced ports;
(e) a source of subatmospheric pressure mounted on said sprung mass;
(f) a source of superatmospheric pressure mounted on said sprung mass;
(g) conduit means connecting one of said ports in said valve sleeve to said source of subatmospheric pressure and the other of said ports to said source of superatmospheric pressure;
(h) the other end of said tubular element having at least one port formed therein and cooperating with said ports in said valve sleeve so that upon an increase in loading over the design load and the consequent decrease in displacement between said sprung and unsprung masses, one of said ports in said valve sleeve and the port in said tubular element will be aligned to provide communication between said chamber and said subatmospheric pressure source, and upon a decrease in loading over the design load and the consequent increase in displacement between said sprung and unsprung masses, the other of said ports in said valve sleeve and the port in said tubular element will be aligned to provide communication between said chamber and said subatmospheric source.

References Cited

UNITED STATES PATENTS 3,033,554    5/1962    Francis    267—34
3,116,918    1/1964    Francis    267—65C PHILIP GOODMAN, Primary Examiner U.S. Cl. X.R.

267—65